(12) United States Patent
Cheng

(10) Patent No.: US 6,424,758 B1
(45) Date of Patent: Jul. 23, 2002

(54) OPTICAL FIBER SOCKET WITH AN INTEGRAL SWITCH

(76) Inventor: Yu-Feng Cheng, No. 7, Fuhsing St., Tucheng Ind. Dist., Tucheng City, Taipei Hsien (TW)

( * ) Notice: Subject to any disclaimer, the term of this patent is extended or adjusted under 35 U.S.C. 154(b) by 30 days.

(21) Appl. No.: 09/667,041

(22) Filed: Sep. 21, 2000

(51) Int. Cl.[7] .................................................. G02B 6/26
(52) U.S. Cl. ........................................ 385/16; 439/911
(58) Field of Search .............................. 385/16, 15, 25, 385/19, 140, 73, 17; 439/188, 911

(56) References Cited

U.S. PATENT DOCUMENTS

| | | | | |
|---|---|---|---|---|
| 2,595,949 A | * | 5/1952 | Karlsson ................. 200/50.29 |
| 4,017,771 A | * | 4/1977 | Baumann ................... 200/50.4 |
| 5,212,744 A | * | 5/1993 | Ohnuki ....................... 385/16 |
| 5,418,872 A | * | 5/1995 | Osaka et al. .................. 385/53 |
| 5,909,525 A | * | 6/1999 | Miller et al. .................. 385/73 |
| 5,926,588 A | * | 7/1999 | Murakami et al. ............. 385/16 |
| 5,930,416 A | * | 7/1999 | Worn et al. ................. 385/147 |
| 5,930,417 A | * | 7/1999 | Wolfe et al. .................. 385/16 |
| 6,011,883 A | * | 1/2000 | Davis et al. .................. 385/16 |
| 6,201,905 B1 | * | 3/2001 | Talbert ........................ 385/19 |
| 6,275,624 B1 | * | 8/2001 | Seddon ........................ 385/16 |

\* cited by examiner

Primary Examiner—Neil Abrams
Assistant Examiner—J. F. Duverne
(74) Attorney, Agent, or Firm—Abelman, Frayne & Schwab

(57) ABSTRACT

An optical fiber socket with an integral switch includes a housing, a cartridge fitted to an under face of the housing, and a switch device sandwiched between the housing and the cartridge. The housing includes a recess which can receive an optical fiber plug therein when a flap covering the recess is raised. Raising and lowering of the flap actuates or isolates the switch of the socket.

7 Claims, 5 Drawing Sheets

OPTICAL FIBER SOCKET WITH AN INTEGRAL SWITCH

BACKGROUND OF THE INVENTION

1. Field of the Invention

The present invention is related to an optical fiber socket, and more particularly to such a socket with an integral switch.

2. Description of Related Art

With continuing advances in information technology, more than one medium input socket may be required. That is, an optical fiber input in addition to an auxiliary socket such as an A/V input is now necessary for many workstations. Conventional workstations may have two or more inputs, and a user has to manually operate a separate switch to turn on or off the desired input. The separate switch inevitably results in a high cost, complicated assembly, loss of space, high chance of failure, and general inconvenience.

As shown in FIG. 5, a conventional fiber socket (50) for receiving signals via an optical fiber cable plug (60) includes a recess (51) configured to receive a tip (61) of the plug (60). The recess (51) has a flap (59) which is pivoted into a housing by a hinge (590). The flap (59) provides a seal against foreign matter which would otherwise impair the quality of fit of the plug (60) in the socket (50) and subsequently impair the quality of the received signals delivered by the cable. Such a socket has the aforementioned drawback of requiring an additional switch by which a user can actuate this socket.

Additionally, the tip (61) of the optical fiber plug (60) is often damaged as it brushes against the flap (59) when the plug (60) is being inserted in the recess (51), whereby signals travelling along the cable may not be transmitted efficiently between the plug and the socket.

Furthermore, the recess (51) has a configuration such that the plug (60) can only be received therein in one position. That is, the plug (60) has two ridges (63) extending from opposed side faces thereof, and another side face with two beveled corners. The recess (51) of the socket (50) is configured to matingly receive the plug (60) and so the ridges (63) and beveled corners limit the alignment between plug (60) and socket (50) to one position only. Such a positional limitation is not only inconvenient for a user trying to insert the plug (60) in the socket (50), which is often in poorly-accessible situation, it also may lead to excessive stress on the cable due to twisting of the optical fiber cable.

Therefore, it is an objective of the invention to provide an optical fiber socket with an integral switch to mitigate and/or obviate the aforementioned problems.

SUMMARY OF THE INVENTION

The main objective of the present invention is to provide an optical fiber socket with an integral switch.

An optical fiber socket in accordance with the present invention includes a housing with a flap at one end covering a recess to receive an optical fiber plug, and a cartridge mounted to a bottom of the housing. The cartridge receives therein a switch device which is moved between an isolated status and a conductive status by a user raising or lowering the flap of the housing, whereby the socket is automatically actuated or isolated.

More specifically, an optical fiber socket containing an integral switch to select between an electrically isolated mode and an actuated mode includes a housing having a recess configured to receive therein an optical fiber plug and defined at one end thereof, a flange extending along three sides of the one end, a flap pivotally attached thereto and receivable in an area defined by the flange, an under face, and at least one passage extending between the area defined by the flange and the under face.

The socket further includes a cartridge having a top face configured to mate with the under face of the housing and retained with the housing by a clip, and a switch device received between the top face of the cartridge and the under face of the housing and partly extendable through the at least one passage of the housing to protrude into the area defined by the flange when the socket is in the actuated mode with the flap raised away from the flange. When the flap is received within the flange the switch device is urged back by the flap from the area defined by the flange when the socket is in the electrically isolated mode.

In further developments, the switch device advantageously includes a first electrical conductor, a second electrical conductor, and an isolator sandwiched between the first and second conductors and movable between a first position to achieve the isolated mode wherein the first and second conductors are electrically isolated from each other, and a second position to achieve the actuated mode wherein the first and second conductors are in electrical contact with each other and complete a circuit between an optical fiber plug received in the recess and the outgoing connections.

The first electrical conductor advantageously includes a top portion shaped as a U and including two side bars and a middle bar integrally extending between the side bars, and a bottom portion extending downward from the middle bar of the top portion, the middle bar further including a raised central section from which the bottom portion extends. The second electrical conductor is substantially shaped as an F and includes an upright bar with a cross bar formed at a top end thereof, two downwardly-inclined resilient fingers formed on the upright bar and extending in a direction opposite the direction of the cross bar, each of the fingers having a distal tip formed horizontal to a respective one of the inclined parts, and each distal tip of the fingers having an upwardly-inclined tab extending in a direction of the upright bar. Furthermore, the isolator is shaped substantially as a U and is movably retained between the first and electrical conductors, and includes two opposed side strips each with a first end and a second end, and a central strip integrally extending between the two side strips and near the first ends thereof, each first end having a beveled front face configured to mate with a respective one of the tabs of the second electrical conductor. In the isolated mode the second ends of the isolator extend respectively through two of the passages of the housing to abut an inner face of the flap, and the tabs of the second electrical conductor and the side bars of the first electrical conductor are separated from each other by the beveled front faces of the isolator urging against the tabs of the second electrical conductor, and in the actuated mode the second ends of the isolator extend respectively through and protrude from the passages of the housing, the tabs of the second electrical conductor contact the side bars of the first electrical conductor and complete a circuit between an optical fiber plug received in the recess and the outgoing connections.

The flap advantageously includes two opposed stubs respectively engageable with two orifices defined in opposed sides of the flange, when the socket is in the isolated mode.

The flap may also advantageously include a window element, and the window element advantageously is tinted to reduce intensity of light passing therethrough. In a further development, a surface of the window element is contoured to reduce intensity of light passing therethrough.

Other objects, advantages and novel features of the invention will become more apparent from the following detailed description when taken in conjunction with the accompanying drawings.

DETAILED DESCRIPTION OF THE PREFERRED EMBODIMENT

Figure 1:
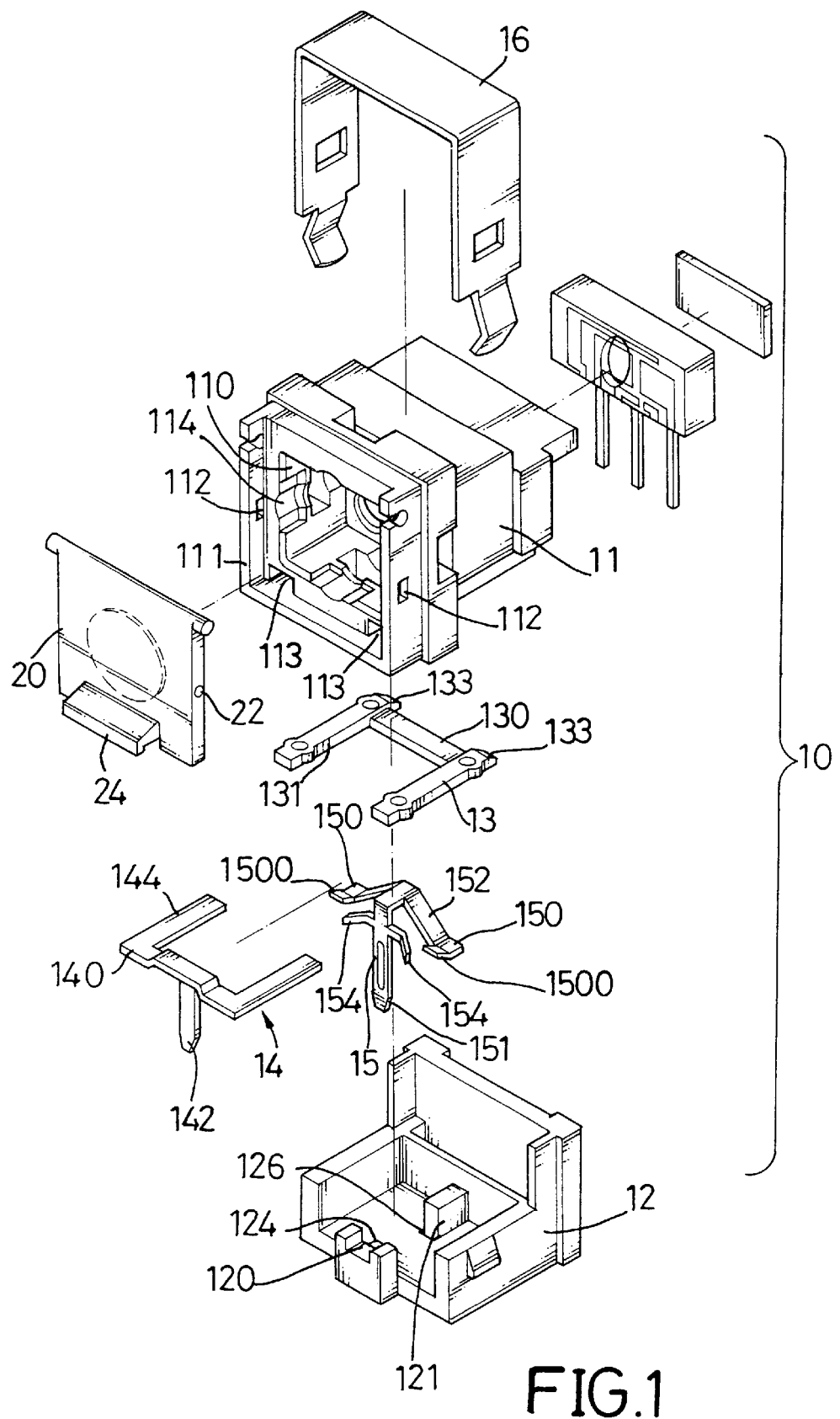
FIG. 1 is an exploded view of an optical fiber socket with an integral switch in accordance with the present invention.

Referring to the figures and particularly FIG. 1, an optical fiber socket (10) includes a housing (11), a cartridge (12) mounted to an under face of the housing (11) by a clip (16) extending therearound, and an electrically-conductive device received between the mated housing (11) and cartridge (12).

Referring to FIG. 1, the housing (11) comprises a recess (110) defined in a first end face thereof, and a U-shaped flange (111) extending from a bottom edge and two side edges of the first end face, whereby a space is defined at a top edge of the first end face. The flange (111) has two identical side walls joined at their bottoms by a bottom wall. Each side wall of the flange (111) has a pivot hole (not numbered) defined therein near a top point thereof, and an orifice (112) defined therethrough and below the respective pivot hole. Two passages (113) extend from the bottom edge of the first end face and below the recess (110) to exit at the under face of the housing (11). The recess (110) has four substantially straight sides each with a longitudinal notch (114) defined at a central point thereof and sized to receive a corresponding ridge of an optical fiber cable (not shown), whereby the cable can be fitted in the recess (110) in four different positions each 90 degrees in rotation from the subsequent position. A flap (20) is configured to be received within the flange (111) and includes two side edges each with a dowel formed at a top thereof and which are sized to be pivotally received in a respective one of the pivot holes, and a stub (22) sized to be receivable in a respective one of the orifices (112). The side walls of the flange (111) have a degree of resiliency which enables them deform sufficiently to retainedly receive and release the stubs (22). The flap (20) further includes a bar (24) protruding from a front face thereof, whereby a user can pull the flap (20) upward and away from the flange (111) to access the recess (110). Additionally, the flap (20) may also include a window portion (26), in this embodiment a circular portion is shown though it is to be appreciated that any configuration is practical, to allow light to pass therethrough into the recess (110). Because light can travel in two directions through the socket (10), a user may wish to look into the socket via the window portion (26) to determine whether light is outgoing from the socket (10). In order to protect a user's eyesight, the window portion may be tinted to reduce intensity of the light. The window portion may further have a surface with a special contour to reduce the intensity of light viewable therethrough, instead of the tint.

Still referring to FIG. 1, the cartridge (12) is substantially L-shaped and has an upper periphery configured to mate with the under face of the housing (11). The cartridge (12) includes a high end wall at a rear end thereof, a front block (120) at a front end thereof, a cavity extending substantially between the end wall and the front block (120), and a central block (121) protruding from a top face defining the cavity. The front block (120) has a notch defined in a top face thereof. A front slot (124) defined close to front block (120) communicates the cavity with an under face of the cartridge (12). A rear slot (126) defined between the central and front blocks (121, 120) communicates the cavity with the under face of the cartridge (12).

Again referring to the figures and FIG. 1 in particular, the electrically conductive device comprises an isolator (13) made of a non-conductive material, a first electrical conductor (14), and a second electrical conductor (15). The isolator (13) is substantially U-shaped and includes two opposed side strips (131) each with an inner edge and an outer edge, and a central strip (130). The side strips (131) are joined at first ends thereof by the central strip (130) extending between the inner edges. First ends of the side strips (131) also include a beveled front face (133). The first conductor (14) comprises a top portion (140) shaped as a U when viewed from above, and a bottom portion (142) extending downward from a middle bar of the top portion (140). The middle bar of the top portion (140) further includes a raised central section from which the bottom portion (142) integrally extends. Two side bars (144) extend in a same direction from respective ends of the middle bar of the top portion (140). The second conductor (15) is substantially F-shaped when viewed from the side, and comprises an upright bar (151) with a cross bar formed at a top end thereof, two downwardly-inclined resilient fingers (152) extending from opposed edges of a distal tip of the cross bar, and two resilient arms (154) extending in a direction opposite that of the cross bar, and formed on the upright bar (151). Each finger (152) has a distal tip (150) formed horizontal to a respective inclined part, and each distal tip (150) has an upwardly-inclined tab (1500) extending in the direction of the upright bar (151). The tabs (1500) are configured to respectively mate with the beveled front faces (133) of the isolator (13).

Figure 2:
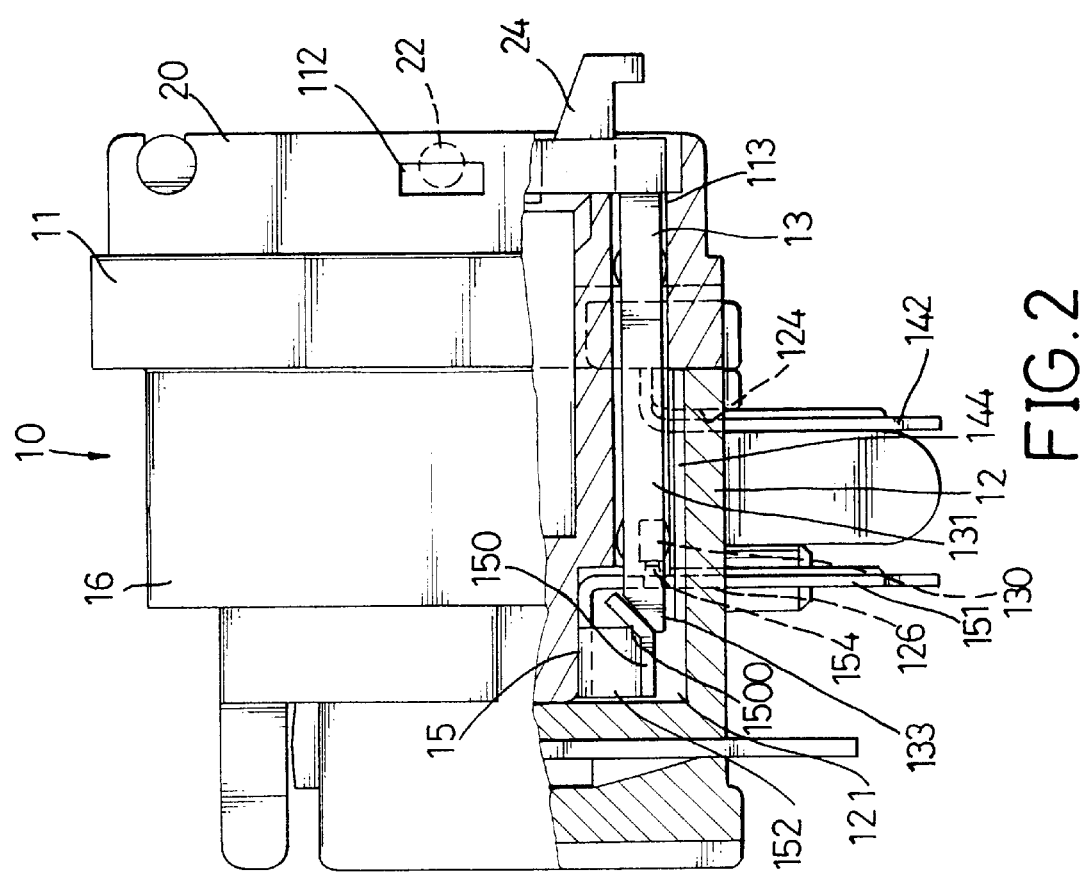
FIG. 2 is a side elevation, partly in cross-section, of the socket shown in FIG. 1.
Figure 3:
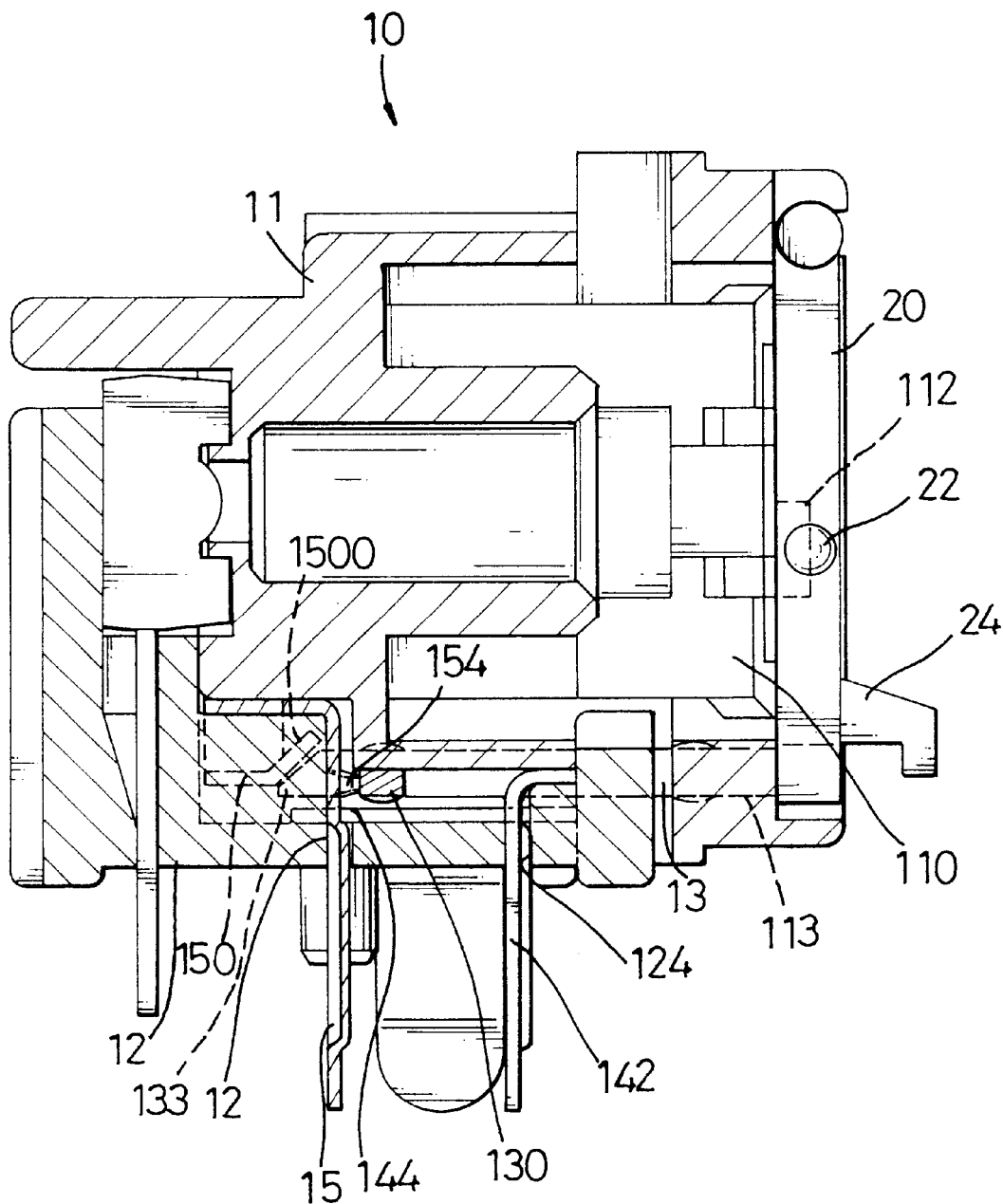
FIG. 3 is a cross-sectional side elevation of the socket shown in FIG. 1, in an isolated mode.
Figure 4:
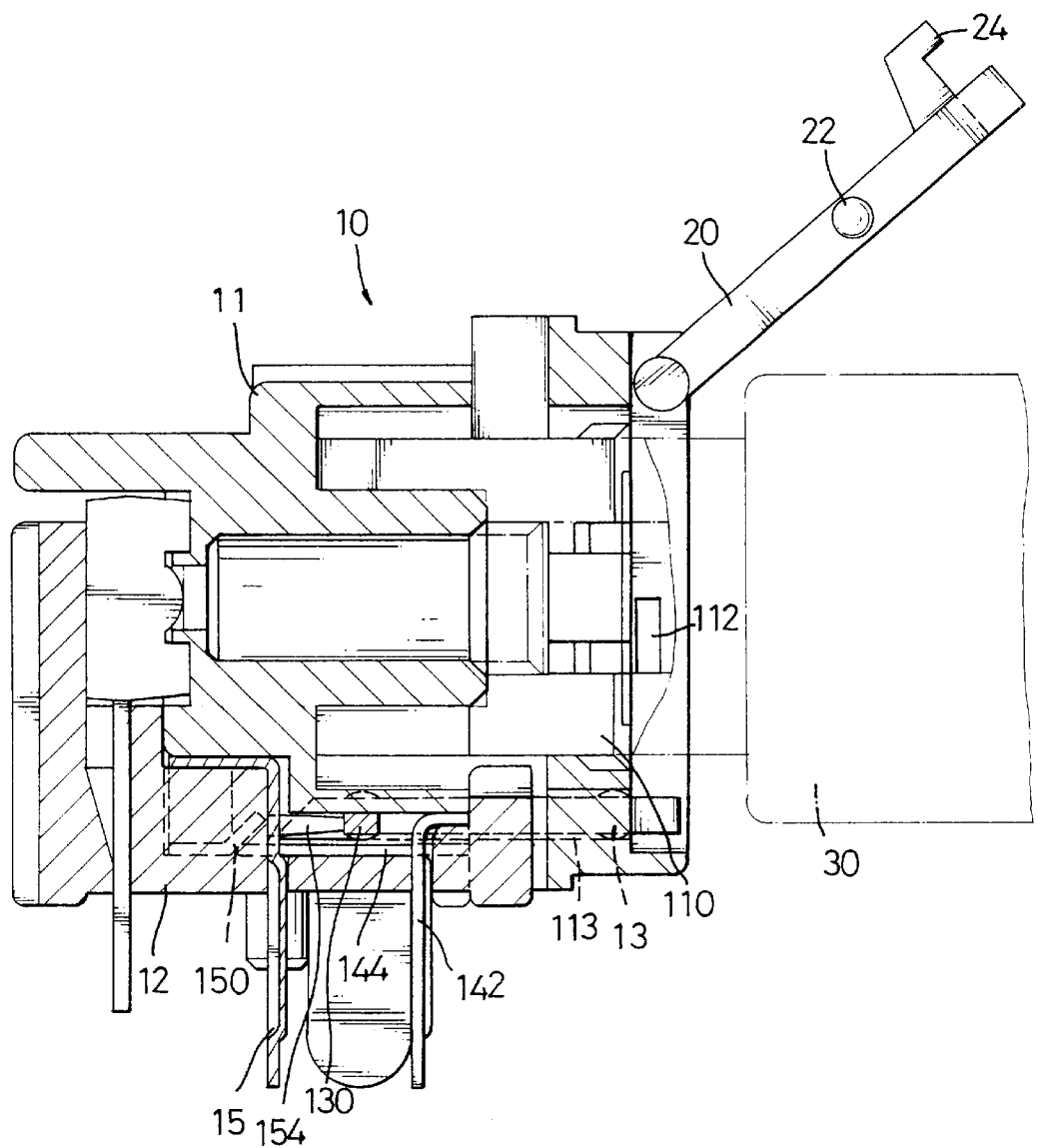
FIG. 4 is a cross-sectional side elevation of the socket shown in FIG. 1, in an actuated mode.
Figure 5:
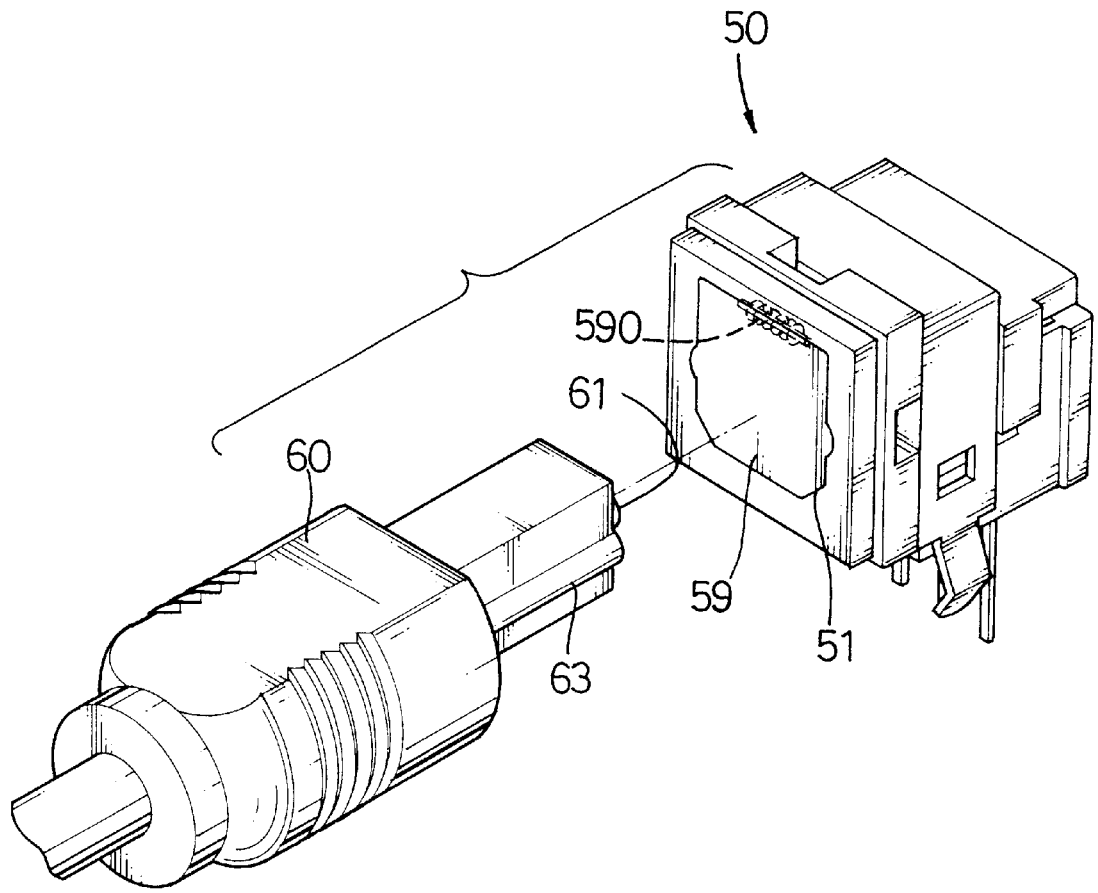
FIG. 5 is a perspective view of a prior art socket for receiving an optical fiber plug.

In assembly, referring to FIG. 2, a lower tip of the upright bar (151) of the second conductor (15) is received in the rear slot (126) of the cartridge (12) such that the arms (154) of the second conductor (15) are in the cavity, the cross bar rests on the central block (121), and the fingers (152) extend down towards the face defining the cavity. The bottom portion (142) of the first conductor (14) is received in the front slot (124) of the cartridge (12) such that the two side bars (144) of the first conductor (14) extend into the cavity. The isolator (13) is mounted over the first conductor (14) and below the second conductor (15) such that the beveled front faces (133) of the isolator (13) can separate the tabs (1500) of the second conductor (15) from being in contact with the side bars (144) of the first conductor (14). The side strips (131) of the isolator (13) respectively extend into the passages (113) of the housing (11) such that the second ends of the side strips (131) can protrude from the front face of the housing (11) combined with the cartridge (12). In the isolated mode shown in FIG. 3, the flap (20) is closed and held in place by the stubs (22) respectively engaging with the orifices (112), and the isolator (13) is pushed forward by the flap (20) urging against the second ends of the isolator (13). Accordingly, as the isolator (13) is moved forward, the central strip (130) thereof urges against the arms (154) of the second conductor (15) to put them in tension, and the beveled front faces (133) separate the tabs (1500) of the second conductor (15) from being in contact with the side bars (144) of the first conductor (14). Referring to FIG. 4 which shows the socket (10) with the flap (20) raised and in the actuated mode, the isolator (13) is free to move backward under force from the stored tension in the arms (154) of the second conductor (15), such that the tabs (1500) move downward to contact the side bars (144) of the first conductor (14). Further connection within the socket (10) to an appliance is conventional and thus not described in further detail.

This is shown in FIG. 4, wherein an appliance (30) is connected with the socket (20) in the actuated mode.

The socket of the present invention has the following advantages:

1. The flap has double function in that it keeps out foreign matter which might otherwise impair incoming signals, and replaces the additional switch necessary in prior art to actuate/isolate the optical fiber mode;
2. The flap has a window to enable safe determination of whether light is present in the socket; and
3. The socket can receive an optical fiber plug in any one of four positions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A optical fiber socket containing an integral switch to select between an electrically isolated mode and an actuated mode, comprising:
    a housing having a recess configured to receive therein an optical fiber plug and defined at one end thereof, a flange extending along three sides of the one end, a flap pivotally attached thereto and receivable in an area defined by the flange, an under face, and at least one passage extending between the area defined by the flange and the under face;
    a cartridge having a top face configured to mate with the under face of the housing and retained with the housing by a clip; and
    a switch device received between the top face of the cartridge and the under face of the housing and partly extendable through the at least one passage of the housing to protrude into the area defined by the flange when the socket is in the actuated mode with the flap raised away from the flange, and when the flap is received within the flange the switch device is urged back by the flap from the area defined by the flange when the socket is in the electrically isolated mode.

2. The optical fiber socket as claimed in claim 1, wherein the switch device comprises:
    a first electrical conductor;
    a second electrical conductor; and
    an isolator sandwiched between the first and second conductors and movable between a first position to achieve the isolated mode wherein the first and second conductors are electrically isolated from each other, and a second position to achieve the actuated mode wherein the first and second conductors are in electrical contact with each other and complete a circuit between an optical fiber plug received in the recess and the outgoing connections.

3. The optical fiber socket as claimed in claim 2, wherein the first electrical conductor comprises
    a top portion shaped as a U and including two side bars and a middle bar integrally extending between the side bars, and
    a bottom portion extending downward from the middle bar of the top portion, the middle bar further including a raised central section from which the bottom portion extends;
    wherein the second electrical conductor is substantially shaped as an F and comprises an upright bar with a cross bar formed at a top end thereof, two downwardly-inclined resilient fingers formed on the upright bar and extending in a direction opposite the direction of the cross bar, each of the fingers having a distal tip formed horizontal to a respective one of the inclined parts, and each distal tip of the fingers having an upwardly-inclined tab extending in a direction of the upright bar; and
    wherein the isolator is shaped substantially as a U and is movably retained between the first and second electrical conductors, and comprises two opposed side strips each with a first end and a second end, and a central strip integrally extending between the two side strips and near the first ends thereof, each first end having a beveled front face configured to mate with a respective one of the tabs of the second electrical conductor, wherein in the isolated mode the second ends of the isolator extend respectively through two of the passages of the housing to abut an inner face of the flap, and the tabs of the second electrical conductor and the side bars of the first electrical conductor are separated from each other by the beveled front faces of the isolator urging against the tabs of the second electrical conductor, and in the actuated mode the second ends of the isolator extend respectively through and protrude from the passages of the housing, the tabs of the second electrical conductor contact the side bars of the first electrical conductor and complete a circuit between an optical fiber plug received in the recess and the outgoing connections.

4. The optical fiber socket as claimed in claim 1, wherein the flap comprises two opposed stubs respectively engageable with two orifices defined in opposed sides of the flange, when the socket is in the isolated mode.

5. The optical fiber socket as claimed in claim 1, wherein the flap comprises a window element.

6. The optical fiber socket as claimed in claim 5, wherein the window element is tinted to reduce intensity of light passing therethrough.

7. The optical fiber socket as claimed in claim 6, wherein a surface of the window element is contoured to reduce intensity of light passing therethrough.

* * * * *